(12) United States Patent
Gilliard et al.

(10) Patent No.: US 10,601,669 B2
(45) Date of Patent: *Mar. 24, 2020

(54) CONFIGURABLE CLIENT FILTERING RULES

(71) Applicant: VMware, Inc., Palo Alto, CA (US)

(72) Inventors: Christopher Gilliard, San Jose, CA (US); James Chi-shun Tsiao, San Jose, CA (US); Konstantin Anatolyevich Bay, Castro Valley, CA (US); Yang Li, Sunnyvale, CA (US); Aram Compeau, Saratoga, CA (US); Xiangfang Li, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 324 days.

This patent is subject to a terminal disclaimer.

(21) Appl. No.: 14/924,368

(22) Filed: Oct. 27, 2015

(65) Prior Publication Data

US 2017/0118084 A1    Apr. 27, 2017

(51) Int. Cl.
*G06F 15/173* (2006.01)
*H04L 12/24* (2006.01)
*H04L 29/08* (2006.01)
*H04L 29/06* (2006.01)

(52) U.S. Cl.
CPC .......... *H04L 41/12* (2013.01); *H04L 65/1063* (2013.01); *H04L 67/10* (2013.01); *H04L 67/141* (2013.01)

(58) Field of Classification Search
None
See application file for complete search history.

(56) References Cited

U.S. PATENT DOCUMENTS

| 7,487,203 B2* | 2/2009 | Sueyoshi | H04L 29/06 709/203 |
| 7,610,330 B1* | 10/2009 | Quinn | H04L 45/02 709/201 |
| 8,098,677 B1* | 1/2012 | Pleshek | H04L 43/12 370/351 |
| 8,219,629 B2 | 7/2012 | Hayes et al. | |
| 8,843,585 B1* | 9/2014 | Normann | H04L 69/329 709/217 |

(Continued)

*Primary Examiner* — Razu A Miah
(74) *Attorney, Agent, or Firm* — Loza & Loza, LLP

(57) ABSTRACT

Techniques for processing application data are described. The techniques include transmitting packets of application data to a data management server. The data management server maintains rules that dictate where the packets go as well as what actions are taken in response to the packets. Based on the rules, the data management server transmits the packets to destinations that may perform various actions. The actions performed by destinations may include logging data received from the applications, or performing other actions such as notifying an administrator or other entity of a particular event, or the like. The described architecture decouples functions such as logging, notification, and the like from the applications for which they are performed, which provides benefits such as improved scalability, as well as removing the need for application developers to build such functionality directly into the applications. This reduces application development time and improves the robustness of application functionality.

17 Claims, 6 Drawing Sheets

(56) References Cited

U.S. PATENT DOCUMENTS

| | | | |
|---|---|---|---|
| 9,319,264 B1 | 4/2016 | Poutievski et al. | |
| 2002/0143955 A1* | 10/2002 | Shimada | H04L 29/06 709/227 |
| 2004/0064577 A1* | 4/2004 | Dahlin | H04L 29/06 709/235 |
| 2004/0068541 A1* | 4/2004 | Bayassi | G06F 9/4843 709/204 |
| 2004/0177158 A1* | 9/2004 | Bauch | H04L 29/06 709/245 |
| 2004/0234268 A1* | 11/2004 | Olch | H04B 10/1149 398/118 |
| 2005/0076102 A1* | 4/2005 | Chen | H04L 41/0677 709/220 |
| 2007/0133433 A1* | 6/2007 | Nam | H04L 41/00 370/254 |
| 2007/0213856 A1 | 9/2007 | Kosaka | |
| 2007/0258460 A1* | 11/2007 | Momtahan | H04L 47/15 370/395.2 |
| 2008/0077696 A1* | 3/2008 | Nguyen | H04L 67/24 709/229 |
| 2008/0120673 A1* | 5/2008 | Dong | H04N 7/17318 725/118 |
| 2008/0181115 A1* | 7/2008 | Soulie | H04L 47/10 370/235 |
| 2009/0097418 A1* | 4/2009 | Castillo | H04L 41/12 370/255 |
| 2009/0259612 A1* | 10/2009 | Hanson | H04L 69/22 706/47 |
| 2010/0014533 A1* | 1/2010 | Hirano | H04W 8/065 370/401 |
| 2010/0312892 A1* | 12/2010 | Woundy | H04L 69/329 709/226 |
| 2011/0153413 A1* | 6/2011 | Chunilal | G06Q 10/00 705/14.42 |
| 2011/0179162 A1* | 7/2011 | Mayo | G06F 9/5077 709/224 |
| 2011/0264804 A1* | 10/2011 | Vuksan | G06F 17/30699 709/225 |
| 2011/0265168 A1* | 10/2011 | Lucovsky | H04L 63/0245 726/7 |
| 2011/0276920 A1* | 11/2011 | Fong | G06F 17/30392 715/810 |
| 2011/0307600 A1* | 12/2011 | Polley | H04L 41/0893 709/224 |
| 2012/0020364 A1 | 1/2012 | Zinjuwadia et al. | |
| 2012/0109958 A1* | 5/2012 | Thakur | G06F 17/30082 707/737 |
| 2012/0158814 A1* | 6/2012 | Sabiwalsky | G06F 9/54 709/201 |
| 2012/0198541 A1* | 8/2012 | Reeves | H04L 63/0227 726/13 |
| 2013/0066951 A1* | 3/2013 | Agranat | H04J 14/0227 709/203 |
| 2013/0091130 A1* | 4/2013 | Barrow | G06F 17/30699 707/723 |
| 2013/0185445 A1* | 7/2013 | Larkin | H04L 65/1016 709/228 |
| 2013/0191460 A1* | 7/2013 | Caldwell | G06Q 10/107 709/206 |
| 2013/0227107 A1* | 8/2013 | Fishman | H04L 45/64 709/223 |
| 2013/0246838 A1* | 9/2013 | Reddy | H04L 41/0659 714/3 |
| 2013/0254262 A1 | 9/2013 | Udall | |
| 2013/0282904 A1* | 10/2013 | Marlow | H04L 63/04 709/225 |
| 2013/0301473 A1* | 11/2013 | Huang | H04L 41/046 370/254 |
| 2013/0340026 A1* | 12/2013 | De Armas | H04L 63/20 726/1 |
| 2013/0340029 A1* | 12/2013 | De Armas | H04L 63/20 726/1 |
| 2014/0136680 A1* | 5/2014 | Joshi | H04L 43/026 709/224 |
| 2014/0214915 A1* | 7/2014 | Dragon | H04L 43/04 709/201 |
| 2014/0298405 A1* | 10/2014 | Qureshi | H04L 41/0816 726/1 |
| 2014/0303934 A1* | 10/2014 | Mylarappa | G06F 11/3006 702/186 |
| 2014/0304412 A1* | 10/2014 | Prakash | H04L 61/1511 709/226 |
| 2015/0127817 A1* | 5/2015 | Paek | H04L 43/028 709/224 |
| 2015/0207677 A1* | 7/2015 | Choudhury | H04L 41/0806 370/254 |
| 2015/0341428 A1* | 11/2015 | Chauhan | H04L 69/16 709/203 |
| 2016/0021022 A1* | 1/2016 | Birger | H04L 65/1069 709/225 |
| 2016/0119413 A1 | 4/2016 | Antipa et al. | |
| 2016/0366108 A1* | 12/2016 | Kamble | H04L 63/12 |

* cited by examiner

CONFIGURABLE CLIENT FILTERING RULES

BACKGROUND

Applications typically emit various types of data such as log data and the like. Log data may be used for debugging purposes, for system administration purposes, or for other reasons. Because these functions typically involve various forms of communication with some high latency system (hard drive, computer network, or the like), these functions complicate development of the application. For example, applications may need to be "scalable," meaning that when load for a particular function such as logging to disk becomes too great, additional computing resources such as additional processors may be utilized to increase throughput.

SUMMARY

Embodiments of the present disclosure provide a method for processing application data. The method includes receiving a first packet of data from a first packet emitter associated with a first application. The method also includes identifying a first emitter ID associated with the first packet emitter. The method further includes identifying a first application data processing destination based on the first emitter ID. The method also includes transmitting the first packet of data to the first application data processing destination. The method further includes processing the first packet of data according to a first rule associated with the emitter ID and associated with the first application data processing destination.

Further embodiments include a non-transitory computer-readable storage medium storing instructions that cause a computer to carry out the above method and a system.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
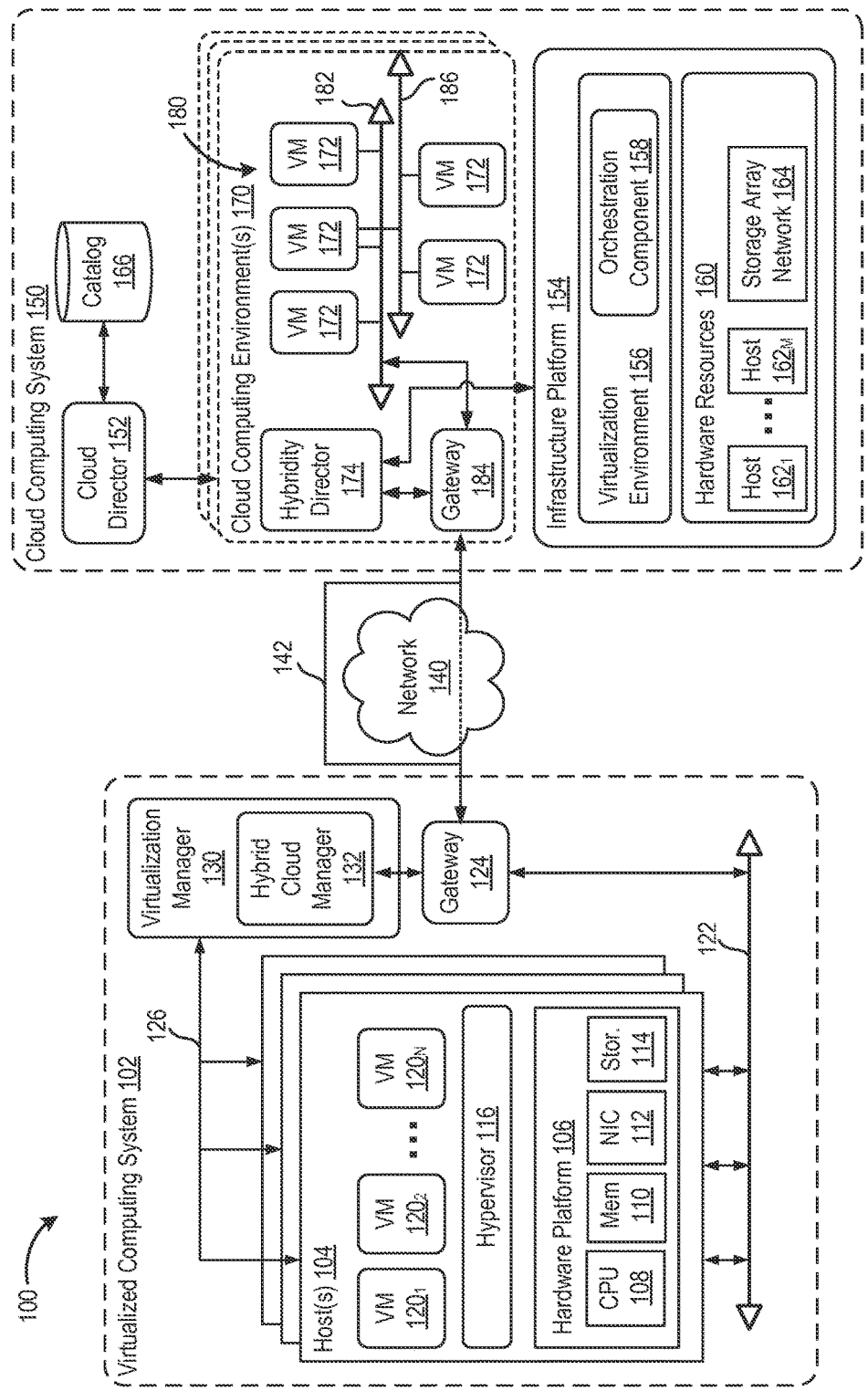
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, or a consumer grade hardware platform such as a desktop, and a laptop. As shown, hardware platform 106 of each host 104 may include conventional components of a computing device, such as one or more processors (CPUs) 108, system memory 110, one or more network interfaces 112, storage 114, and other I/O devices such as, for example, a mouse and keyboard (not shown). Processor 108 is configured to execute instructions, for example, executable instructions that perform one or more operations described herein and may be stored in memory 110 and in local storage (such as in storage 114). Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same host. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the VMware vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 172, deploy multi-tier applications on VMs 172, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX®-based hypervisor technologies provided by VMware, Inc. of Palo Alto, Calif. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagate such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct instantiated and managed by a tenant that provides compute, network, and storage resources to that tenant. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., cloud gateway 184), as well as one or more isolated internal networks 186 not connected to cloud gateway 184. Cloud gateway 184 (e.g., executing as a virtual appliance) is configured to provide VMs 172 and other components in cloud computing environment 170 with connectivity to external network 140 (e.g., Internet). Cloud gateway 184 manages external public IP addresses for virtual data center 180 and one or more private internal networks interconnecting VMs 172. Cloud gateway 184 is configured to route traffic incoming to and outgoing from virtual data center 180 and provide networking services, such as firewalls, network address translation (NAT), dynamic host configuration protocol (DHCP), and load balancing. Cloud gateway 184 may be configured to provide virtual private network (VPN) connectivity over a network 140 with another VPN endpoint, such as a gateway 124 within virtualized computing system 102. In other embodiments, cloud gateway 184 may be configured to connect to communicate with virtualized computing system 102 using a high-throughput, dedicated link (depicted as a direct connect 142) between virtualized computing system 102 and cloud computing system 150. In one or more embodiments, gateway 124 and cloud gateway 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

Although not shown in FIG. 1, cloud computing system 150 may support multiple tenants. Accordingly, hybridity director 174 is configured to enable separate, tenant-specific virtualized computing platforms between each virtualized computing system 102 and cloud computing system 150, while maintaining secure separation between tenants. Hybridity director 174 may employ any technically feasible security and separation measures to implement secure separation. For instance, in some embodiments, hybridity director 174 coordinates access control, virtual local area network (VLAN) segmentation, and virtual storage controllers to enforce secure separation. As used herein, tenants may represent unique customers, independently maintained on-premises virtualized computing systems 102 that are associated with a single customer, or any combination thereof. Tenants may interact with tenant-facing software components implemented within VMs 172 or other components of cloud computing environments 170.

For a given tenant, virtualization manager 130 performs on-premises management tasks to support virtualized computing system 102 internally, independent of virtualization managers 130 of other tenants. Such tasks may include provisioning VMs 120, migrating VMs 120 between hosts 104, and allocating physical resources, such as CPU 108 and memory 110.

Further, for a given tenant, hybrid cloud manager 132 performs cross-cloud management tasks, such as deploying VMs in cloud computing system 150, and migrating VMs from virtualized computing system 102 to cloud computing system 150. Such cross-cloud management tasks involve interaction with a corresponding hybrid cloud manager 132 of a given tenant, and therefore such operations are sometimes referred as "tenant-facing" operations.

Figure 2:
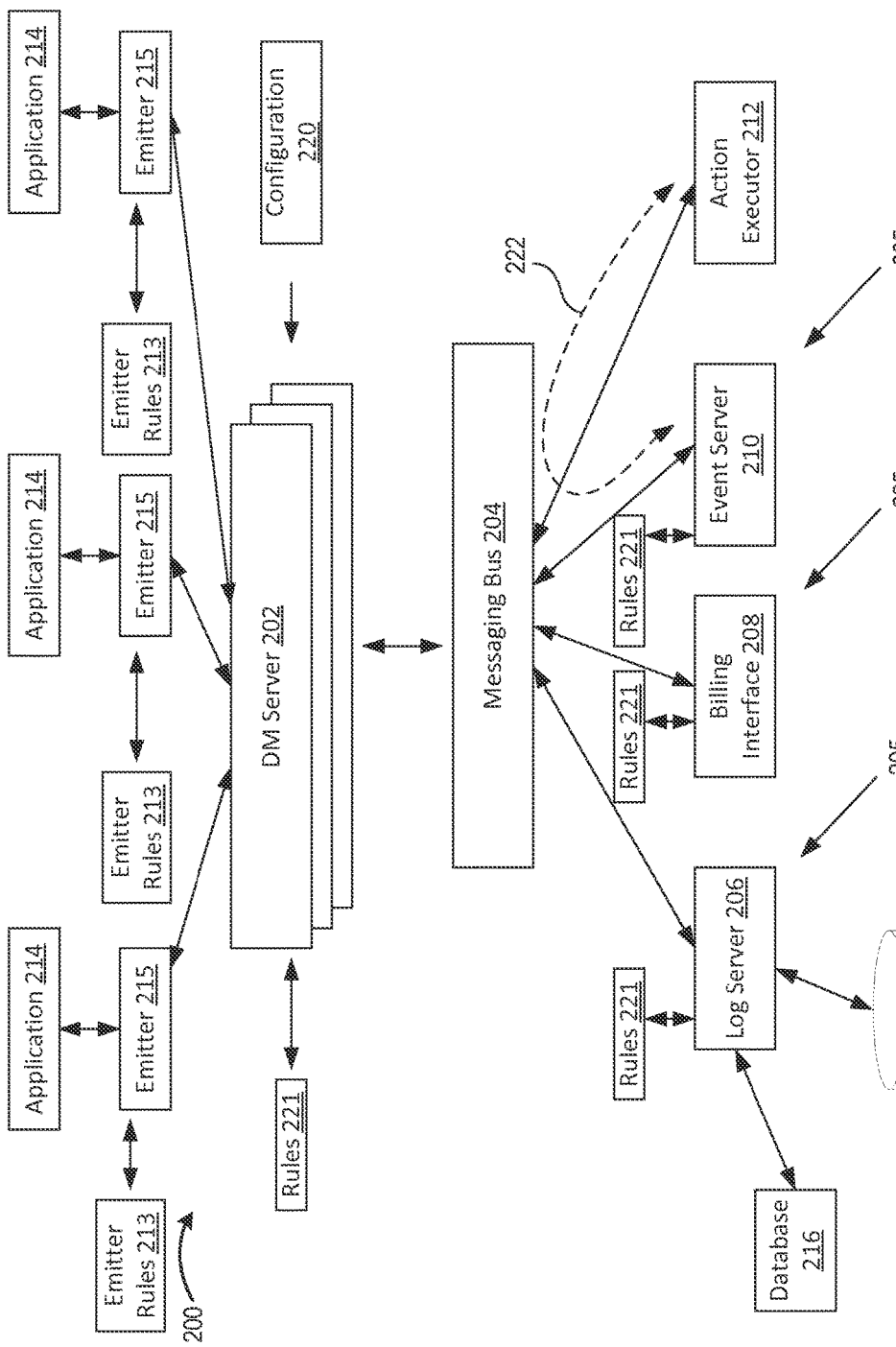
FIG. 2 is a block diagram of a data management system, according to an example.

FIG. 2 is a block diagram of a data management system 200, according to an example. As shown, data management system 200 includes one or more data management ("DM") servers 202, a messaging bus 204, and packet destinations 205 (also referred to simply as "destinations" herein). Destinations 205 include log server 206, billing interface 208, and event server 210. Although specific destinations 205 are shown and described herein, other destination types may be used. For example, in some embodiments, billing interface 208 may not be present. Data management system 200 also includes an action executor 212. Applications 214 interface with DM servers 202 of data management system 200 via emitters 215.

DM servers 202, messaging bus 204, log server 206, billing interface 208, event server 210, and action executor 212 may be software processes executing on computer hardware. Applications 214 may be software processes executing within hybrid cloud system 100 or on hardware outside of such system. The computer hardware on which these software processes (DM servers 202, messaging bus 204, log server 206, billing interface 208, event server 210, action executor 212, and applications 214, as well as other software processes described herein) execute may include standard computing resources such as a computer having one or more processors configured to execute instructions stored in a memory. The software processes may alternatively execute within virtual machines, such as VMs 120 or VMs 172 illustrated in FIG. 1, in "containers" such as Docker containers available from Docker, Inc. of San Francisco, Calif., or in other execution contexts. Each element shown in FIG. 2 may be separate processes that can be "scaled up" through duplication to create new instances of the process or "scaled down" by disabling a specific duplicated instance of the process. Messaging bus 204 may be a server implementing a publish-subscribe type messaging bus, where entities can publish messages to specified queues in the messaging bus 204 and entities subscribed to those queues will receive such messages. One example of a messaging bus is the NATS messaging system, developed by Apcera, Inc. of San Francisco, Calif. One example of a server that can implement the NATS messaging system is the gnatsd messaging server.

Emitters 215 may be embodied as separate software modules having functionality accessible to applications 214 and executing on any of the hardware described herein, including hardware external to data management system 200 and local to applications 214. Emitters 215 may comprise a ".jar" file (Java archive file), a ".DLL" file (Microsoft Dynamically Linked Library), or another type of shared library. In some embodiments, emitters 215 are developed by developers and/or administrators of DM server 202. Emitters 215 may be provided to developers of one or more applications 214 for use with DM server 202 and the rest of data management system 200.

Applications 214 use emitters 215 to transmit data packets to destinations 205 as specified by rules. These rules may also be referred to herein as "destination rules." (Note that the term "rules," when used without the modifier "emitter" as in "emitter rules," refers to these "destination rules."). The use of emitters 215 provides developers of applications 214 with a simple interface with which to take action based on particular data. This frees developers of each application from the necessity of building such functionality directly into the applications. For example, developers do not need to build logging functionality, notification functionality, or other functionality performed by destinations 205 into the application. Instead, applications 214 simply "emit" data that might be acted upon by destinations 205, an administrator specifies, via rules 221, what actions to take by destinations 205, and the destinations 205 take the specified actions. Aside from freeing application developers from the need to build such functionality directly into the applications, data management system 200 also provides scaling for the functions performed by destinations 205. This scaling may include provisioning additional computing resources to accomplish tasks specified by rules when the tasks consume too many computing resources. In one example, logging information from applications 214 may consume a lot of time since disk input/output (I/O) is typically a slow process. By utilizing data management system 200 to perform such logging functionality, applications 214 are freed from the duty of writing to disk and thus the need to scale when the disk write load becomes too heavy.

In operation, applications 214 generate packets and request emitters 215 to transmit those packets to data management system 200 for further action. The generated packets include an emitter ID that uniquely identifies a particular emitter 215 or set of emitters 215, as well as payload data that may be embodied as key-value pairs. The payload data represents data that an application desires to have logged to otherwise acted upon.

Packets transmitted by applications 214 via emitters 215 may include many different types of data. In some embodiments, the packets include data that may typically be logged by applications 214. Applications often generate log data for debugging purposes or for other purposes. In various embodiments, log data includes memory contents, such as the values stored in various variables, as well as specifically generated error messages such as strings that indicate specific errors or error conditions.

Emitters 215 transmit packets generated by an application 214 to DM servers 202. DM servers 202 store rules 221 that define which destinations 205 receive packets from which emitter IDs, as well as the behavior performed by the destinations in response to the packets. An administrator may connect to a DM server 202 (via, e.g., a command line interface), and provide configuration data 220 to a DM server 202, where configuration data 220 specifies new rules 221 for storage and use. Such administrators may be, for example, developers or users of an application 214 that wish to have certain behavior performed in response to data emitted by the application.

DM servers 202 transmit the packets, via messaging bus 204, to one or more destinations 205. In some embodiments, messaging bus 204 includes one or more queues, each of which is associated with a different emitter ID. In such embodiments, responsive to receiving a packet from an application 214, DM server 202 transmits the packet to messaging bus 204 for storage in the queue that is associated with the emitter ID of the emitter the packet is received from. Messaging bus 204 then pushes such packets to destinations 205 subscribed to that queue. Rules 221 determine which destinations 205 are to handle packets from which emitters IDs and thus determine which destinations 205 are subscribed to a queue associated with a particular emitter ID. Destinations 205 may subscribe to a particular queue in response to receiving a rule 221 from DM server that indicates that that destination 205 should perform some action in response to packets having the emitter ID associated with the particular queue. Destinations 205 can include log server 206, billing interface 208, or event server 210, as well as other destinations not specifically shown in FIG. 2. Destinations 205 perform actions specified by rules 221 on received packets. In some embodiments, messaging bus 204 stores queues associated with each destination 205. A destination 205 subscribes to its associated queue in order to receive rules from DM server 202.

So that destinations 205 may process rules 221, DM server 202 transmits rules 221 to one or more destinations 205 that are specified to act based on the rule, via messaging bus 204. Destinations 205 store the rules so that the destinations may act on the rule when appropriate. Rules may be changed at any time by providing new rules to DM servers 202. When a rule is specified by configuration information 220, DM servers 202 receive the rule and transmit the rule to messaging bus 204, which transmits the rule to the destination(s) specified by the rule.

DM server 202 may store all rules sent to destinations 205 for filtering purposes. Specifically, to decrease the overall load on messaging bus 204, DM server 202 may filter packets received from applications 214, depending on the rules that are stored. If, for any particular emitter ID, there is no rule that specifies that at least one destination 205 receives packets for that emitter ID, then DM server 202 does not transmit packets received from emitters 215 with that emitter ID to messaging bus 204. This filters out packets that have no "effect" due to there being no rule for such packets.

Emitters 215 may communicate with DM server 202 via a number of different protocols. In one example, applications 214 may use a RESTful ("representational state transfer-ful") interface such as HTTP ("hypertext transfer protocol"). In another example, applications 214 may use the NATS protocol. In a further example, applications 214 may use transmission control protocol (TCP) to connect to a DM server 202. To emit a packet using the protocol, an application 214 would wrap the packet in whatever structure the protocol would require (e.g., HTTP request headers, or a TCP packet) and transmits the wrapped packet to the DM server 202. The DM server 202 removes the wrapper to obtain the packet to be transmitted to the messaging bus 204.

In some embodiments, packets emitted by emitters 215 include one or more key-value pairs, where each value may have one or more fields. Multiple fields within a particular value of the key-value pair may be distinguished by location of placement within the value. Rules describe what actions to take by destinations 205 for any particular field in a packet. Rules can specify that for any particular combination of emitter ID, key, and field, a particular action is to be taken by a particular destination 205.

Rules may specify actions to be taken by log server 206 or billing interface 208. Rules may also specify which events to generate by event server 210. Rules may further specify what actions to take by action executor 212 in response to particular generated events. Actions that may be taken by the log server 206 include storing information found in packets into a database 216, non-volatile storage 218, or other location. Billing interface 208 translates packets received from the messaging bus 204 to calls to a billing system (not shown). Billing interface 208 may be optional. Event server 210 generates events to control action executor 212. Action executor 212 is an interface to "external" systems that can perform actions. Actions taken by action executor 212 may include sending an email, sending an HTTP request, sending an SMS ("short message service") message, or performing other actions such as restarting a computer system, an application or VM (e.g., VM 120 or VM 172), spawning a new VM, or starting a different application. Many other actions are of course possible.

Rules 221 may specify that any of the actions described herein are to be performed in response to a particular trigger. Triggers specify one or more conditions that are to be met before the specified action is to be performed by a destination 205. Some example triggers are now described. One example of a trigger is detecting that a particular field in a received packet has a particular value. For example, a trigger may include the fact that a text field has a particular string value such as "ERROR" or the like. Another example of a trigger is detecting that a particular value in a particular field meets a particular comparison with another particular value (e.g., is greater than the value, is less than the value, is equal to the value, is greater than or equal to the value, is less than or equal to the value, or any other comparison type). A trigger may also be an accumulation type trigger. An accumulation type trigger is met when a condition is met a certain number of times. In one example, an accumulation type trigger is met when a packet having a particular value is seen a threshold number of times. In another example, an accumulation type trigger is met when a packet having a value greater than a comparison value is seen a threshold number of times. Triggers can use logical conjunctions such as AND, OR, and the like so that triggers will be met when both of two different values are seen (or two comparisons are met) or either of two different values are seen (or comparisons are met).

Triggers may also be associated with a heartbeat mechanism. More specifically, one or more applications 214 may implement a heartbeat mechanism whereby a particular status is monitored based on a periodically transmitted heartbeat message. The status may be, for example, that the application 214 (or the hardware or software platform on which the application is running) is still operational and has not become disabled. As the application 214 executes, it emits a packet including a heartbeat message. Event server 210 may monitor these packets and when event server 210 does not receive a heartbeat message a certain threshold amount of time after receiving a previous heartbeat message, event server 210 may generate an event in response. The event is transmitted, via messaging bus 204, to action executor 212 (via pathway 222). The event may cause action executor 212 to perform one or more actions in response. In one example, the event causes action executor 212 to restart the application or to restart the hardware or software platform (e.g., restart a VM 120 or VM 172) in response. This behavior would of course be defined by one or more rules.

To verify the identity of emitters 215, emitters 215 may be authenticated by DM server 202. When an application 214 starts or restarts, the application requests, via an emitter 215, to be connected to a DM server 202. To ensure that a particular emitter 215 has permission to send packets to destinations via DM server 202, when an emitter 215 requests a connection to a DM server 202, the DM server authenticates the emitter. Authentication may be done in any technically feasible manner. During authentication, the authenticated emitter transmits an associated emitter ID to DM server 202 so that DM server 202 knows which emitter ID has just been connected.

Any of DM server 202, messaging bus 204, log server 206, billing interface 208, event server 210, and action executor 212 may be "scaled." Scaling refers to the ability to increase or decrease the number of instances of a particular element that are listening to the messaging bus 204. A destination 205 may be scaled "up" by duplicating that destination 205 and subscribing the duplicated destination 205 instances to the queues the original destination 205 is subscribed to. Messaging bus 204 splits packets intended for a particular destination 205 between all copies of that destination 205. Scaling down refers to shutting down and unsubscribing one or more instances of a destination 205 from the messaging bus so that a smaller number of destinations 205 receive packets. Scaling may be performed upon detecting that the workload (as measured by utilization of computing resources such as processor cycles, memory, cache, or the like) for a particular entity is too high or too low.

Emitters 215 can filter packets based on emitter rules 213. Emitter rules 213 can be set via configuration data 220 by, for example, an administrator connecting to a DM server 202. When an emitter 215 connects to a DM server 202, the DM server sends emitter rules 213 for the emitter ID associated with the now-connected emitter 215 to that emitter 215. DM server 202 also sends emitter rules 213 to the emitter when new emitter rules 213 are specified via configuration data 220. Emitter rules 213 indicate which packets accepted by emitters 215 from application 214 are to be actually transmitted to DM server 202. One purpose of filtering packets is to reduce the workload experienced by DM server 202 and possibly also by messaging bus 204.

Emitter rules 213 may specify particular triggers for filtering out packets. Such triggers may include meeting a comparison between a particular value within a packet and a particular value specified in the emitter rule. In one embodiment, a value for comparison may be a string (sequence of characters). In one example, a value within a packet to test may be a value that specifies a particular error. Values for that field may indicate "ERROR" or "OK" or something similar. The trigger may test the value and only emit packets with the value "ERROR" (or may only emit packets with the value "OK"). In another example, there may be more than two possible values indicating different error levels. For example, possible values may include "ERROR", "WARNING," "NOTICE," and "OK." In this example, each value of error may be associated with a particular numerical value, such as 0, 1, 2, and 3. An emitter rule may specify that error levels below a particular numerical value (e.g., below 2—that is, errors 0 and 1) should be filtered out but that error levels equal to or greater than that numerical value should not be filtered out. Other triggers, such as different types of numerical or string comparisons, may of course be used for emitter rules 213.

Because DM servers 202 centrally manage emitter rules 213, an administrator does not need to connect to each application 214 individually to specify emitter rules. Instead, an administrator specifies a set of rules for an emitter ID and the DM server 202 pushes that set of rules out to each application 214 with the associated emitter ID. The DM servers 202 thus centrally control behavior to be performed by destinations 205 in response to packets received from applications 214.

When an application 214, via an emitter 215, authenticates to a DM server 202, DM server 202 determines the emitter ID for the authenticated and now-connected emitter. DM server 202 identifies the rules that are associated with that emitter ID and "pushes" those rules out to the emitter that just connected so that that emitter is able to filter packets according to the established emitter rules. Note that DM server 202 maintains a persistent connection with an authenticated emitter 215 and, when emitter rules are updated (e.g., by an administrator), pushes those updated rules out to the emitter(s) to which the rules pertain. Emitter rules are thus updated in real time so that packets requested to be emitted by an application 214 are affected by emitter rules established after the application starts. Also, note that DM servers 202 maintain consistency of emitter rules by pushing out rules to each emitter that pertains to such rules. A new emitter rule provided by an administrator affects each emitter 215 to which that emitter rule pertains.

Note that filtering emitted packets in the manner described herein may be used in contexts other than with the data management system 200. Such a filter system, uncoupled from data management system 200, would include a centralized filter control server (analogous to the DM server 202) that communicates with one or more emitters. The filter control server stores emitter rules that may be provided by, for example, an administrator, via a command line interface. When an emitter connects to the centralized filter control server, the filter control server determines the emitter ID of the emitter, identifies emitter rules associated with the emitter ID, and transmits the identified rules to the emitters. An emitter monitors packets received from an associated application based on the emitter rules, filtering out packets as dictated by the emitter rules. Note also that instead of emitters filtering packets, emitters can instruct applications 214 not to generate packets that would otherwise be filtered by emitters.

The architecture illustrated in FIG. 2 provides several benefits. First, applications do not need to be written to perform the functions achieved by the data management system 200. Instead, applications simply emit data for which various actions are desired to be performed. An administrator can, at any time, provide rules to DM server 202 to cause DM server to perform various actions on the data emitted. This reduces application development time, complexity, and cost.

Second, because data management system 200 performs various actions desired by the application writer, applications are not bottlenecked by those actions. Individual applications do not need to scale in order to meet load requirements. In one example, an application that does not use data management system 200 but instead performs actions like disk I/O for logging itself might have to scale if a large amount of disk I/O was being performed. This is because disk I/O is a high-latency operation. By using data management system 200, an application can transfer the workload related to performing operations like disk I/O to data management system 200, which is able to scale as needed. The application is alleviated from being required to scale to meet workload requirements.

Figure 3:
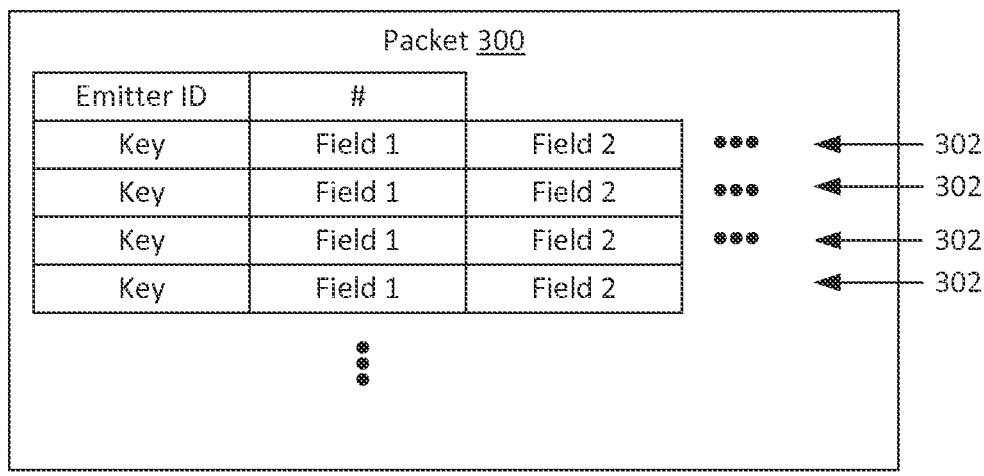
FIG. 3 is an illustration of a packet, according to an example.

FIG. 3 is an illustration of a packet 300, according to an example. As shown, the packet 300 includes an emitter identifier, which identifies the application 214 that emitted the packet, as well as a number of key-value pairs 302. Each key value pair includes a key as well as one or more fields. Packets may include one or more key-value pairs 302.

The fields contain specific information emitted by applications. The fields do not have any pre-set meaning Instead, the way fields are handled is defined by the rules. Fields may be identified by their position in a key-value pair. Rules may specify, for example, that a first field is to be logged, that a second field is to be checked for event generation, and so on. Fields may be treated differently based on the emitter ID included in packet 300. For example, field 1 may be logged for a first emitter ID but may be checked to generate an event for a second emitter ID. Note that although a specific format for a packet 300 is illustrated, other packet formats are of course possible.

Figure 4:
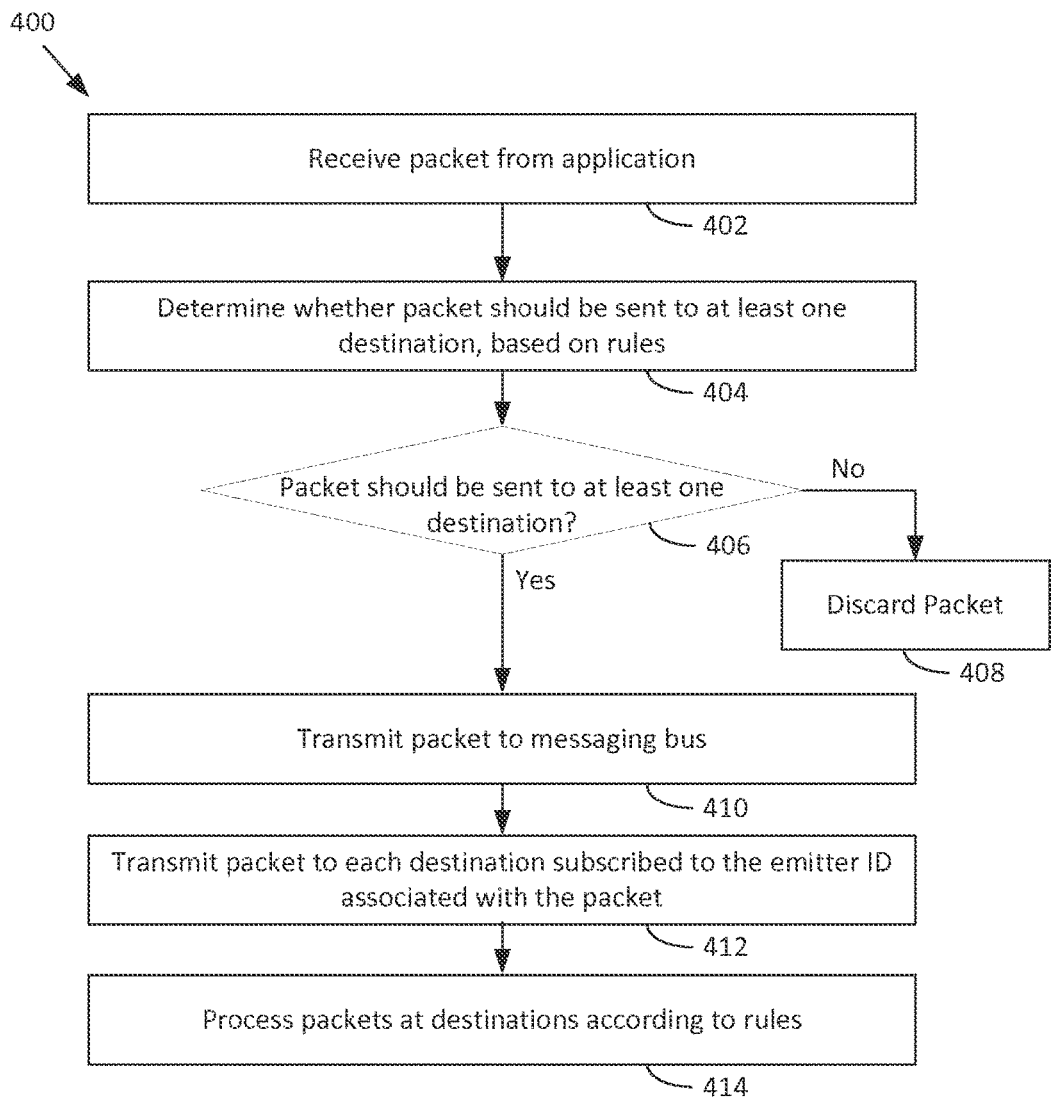
FIG. 4 is a flow diagram of a method for processing packets emitted by applications, according to an example.

FIG. 4 is a flow diagram of a method 400 for processing packets emitted by applications, according to an example. Although described with respect to the system of FIGS. 1-2, it should be understood that any system that performs the method, in various technically feasible orders, falls within the scope of the present disclosure.

As shown, method 400 begins at step 402, where a DM server 202 receives a packet from an application 214. The packet includes an emitter ID that uniquely identifies the application that emitted the packet as well as one or more key-value pairs. The keys act as labels for values associated with that key. The values specify any type of data the application 214 desires to be acted upon. Values in key-value pairs may include multiple fields. Rules define how the different fields are interpreted.

At step 404, DM server 202 determines, based on rules already received, whether the received packet should be transmitted to any destination. If any rule dictates that packets having the emitter ID stored in the received packet should go to at least one destination, then the outcome of the step 404 determination is that the packet should be sent to at least one destination and method 400 proceeds to step 410. If no rule dictates that packets having the emitter ID should go to at least one destination, then the outcome of the step 404 determination is that the packet should not be sent to at least one destination and method 400 proceeds to step 408.

At step 408, the DM server 202 discards a packet for which no rule dictates that the packet should be sent to at least one destination. This "filtering" function helps remove unnecessary traffic from messaging bus 204. At step 410, DM server 202 transmits the packet to the messaging bus 204 because at least one rule says that the packet has at least one destination.

At step 412, messaging bus 204 transmits packets to each destination for which a rule specifies that such packets should be transmitted. Rules direct packets to destinations by specifying that packets having particular emitter IDs (which are associated with particular applications 214) should be directed to one or more destinations. For example, a first rule may specify that a packet from a first application should be directed to the log server 206 and the event server 210 and a second rule may specify that a packet from a second application should be directed to only the log server 206. Messaging bus 204 would transmit packets specifying those emitter ID's accordingly.

At step 414, the one or more destinations that receive packets process the packets according to rules. Rules specify actions to be taken in response to particular data stored in particular fields. Rules may specify that a destination must test a particular trigger condition before an action is taken. For example, rules may specify that a particular field is tested against a numerical value (e.g., is greater than, is less than, or is equal to), a string value (e.g., the field includes a string of "ERROR"), or may specify other trigger conditions. Rules may specify various actions that are to be taken in response to the trigger conditions. For example, rules may specify that log server 206 should record, in database 216 or storage 218 (which can be local disk, network attached storage, or other storage), data included in one or more fields of the received packet. Rules may specify that event server 210 generates a particular event in response to meeting a trigger condition. For example, rules may specify that event server 210 should generate an event directing action executor 212 to send a notification (e.g., via email, SMS messages, instant message) to a particular entity in the event of a particular trigger being met, that event server 210 should generate an event directing action executor 212 to send a notification to a particular entity to cause the particular entity to restart a computer system, restart a VM, spawn a new VM, start a new application, or to perform any other action.

Note that rules can be changed at any point during, before, or after method 400. Configuration data 220 provided by an administrator to DM server 202 may specify rules. DM server 202 determines which destinations should receive the rule and transmits the rules to those destinations. At step 414 of method 400, destinations use these rules to process received packets.

Figure 5:
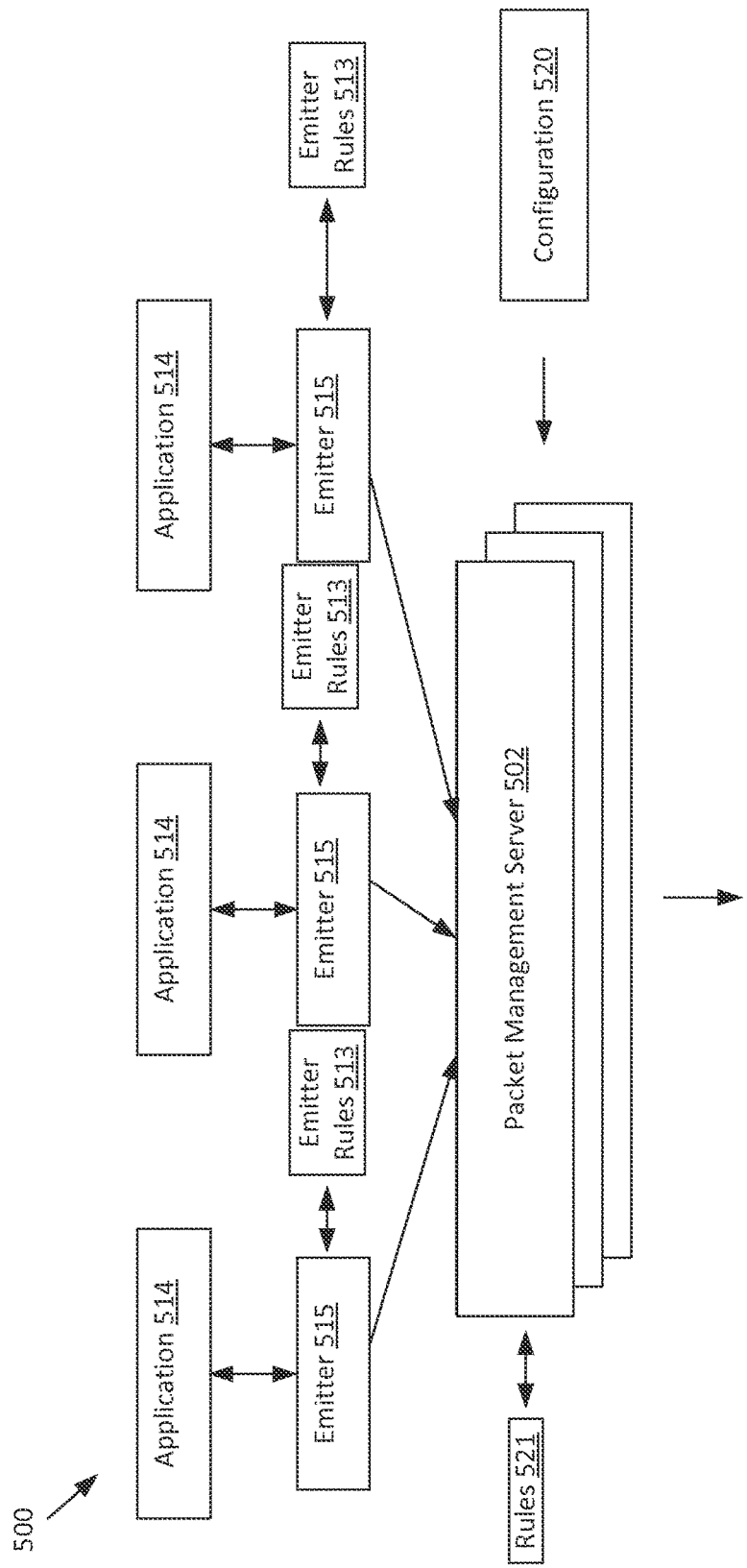
FIG. 5 is a block diagram of a packet filtering system, according to an example.

FIG. 5 is a block diagram of a packet filtering system 500, according to an example. As shown, packet filtering system 500 includes applications 514, emitters 515, and filter configuration server 502.

Applications 514 may be similar to applications 214 and can be any type of application for which filter control of output data is desired. While FIG. 2 shows emitter rules in the context of data management system 200, FIG. 5 is presented to illustrate that emitter rules 513 (and a packet filtering system in general) can be used in contexts other than data management system 200.

Emitters 515 are similar to emitters 215 of FIG. 2. Packet management server 502 is similar to DM server 202 of FIG. 2, but is not necessarily connected to a messaging bus 204 and does not necessarily pass packets received from applications to destinations such as those shown in FIG. 2.

Packet management server 502 emits packets as specified by emitter rules and also centrally controls the distribution of emitter rules 513, both of which are functions performed by DM server 202. More specifically, packet management server 502 accepts emitter rules from configuration data 520. The emitter rules 521 specify conditions for filtering out packets received from applications 514. Conditions may be based on comparing values specified in the packets to values specified by the emitter rules 521. Such conditions may be any of the types specified above with respect to FIG. 2 as well as other types not specifically disclosed herein.

Rules 521 are obtained responsive to emitters 515 connecting to packet management servers 502 and also responsive to new rules being provided in configuration data 520 to packet management servers 502. In some embodiments, emitters 515 connect to packet management servers 502 via a connection technique. As a part of this connection technique, packet management servers 502 transmit filter rules that are applicable to the now-connected emitter 515. The determination of which rules are applicable to the emitter may be made based on the emitter ID specified in the rules stored by packet management server 502. For example, if the emitter ID included in a rule matches the emitter ID of the connected emitter, then packet management servers 502 transmit that rule to the emitter. If the emitter IDs do not match, then packet management server 502 does not transmit that rule to the emitter. Rules are also transmitted when new configuration data 520 specifying a new rule is transmitted to packet management server 502. More specifically, upon receiving such a rule, packet management server 502 transmits the rule to the emitter 515 to which that rule pertains (a determination that is based on the emitter ID specified in the rule).

Figure 6:
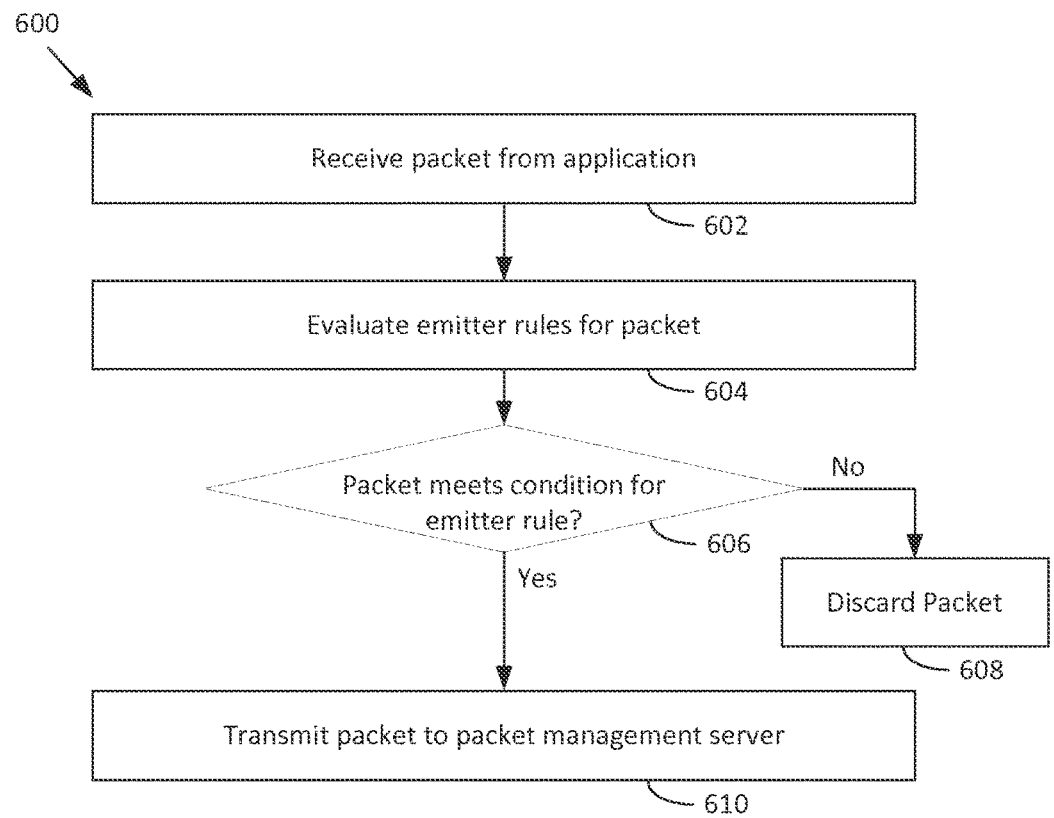
FIG. 6 is a flow diagram of a method for filtering packets emitted by applications, according to an example.

FIG. 6 is a flow diagram of a method 600 for filtering packets emitted by applications, according to an example. Although described with respect to the system of FIGS. 1-2 and 5, it should be understood that any system that performs the method, in various technically feasible orders, falls within the scope of the present disclosure.

At step 602, an emitter 515 receives a packet from an application 514. The packet may specify any kind of data for transmission to another entity to act upon. As described above, applications 514 may be developed by one party and emitters may be a shared library (such as a .jar file or a .DLL file) developed by a separate party and that is provided to the developer or administrator of application 514 for use with packet management server 502.

At step 604, the emitter evaluates the stored rules for the received packet. As described above, such rules may specify various "trigger conditions" that, when evaluated one way (such as true) cause packets to be discarded and when evaluated another way (such as false) cause packets to be kept and transmitted to packet management server 502. As also described above, triggers included in such rules may be that a value found within a packet is the same as a value specified by the rule, that the value in the packet is greater than or less than the value specified by the rule, or that any other comparison should be performed for such two values.

At step 606, the emitter determines whether the packet meets the condition for the emitter rule. If the condition is met, then method 600 proceeds to step 610 and if the condition is not met, then method 600 proceeds to step 608. At step 608, the emitter discards the packet without transmitting the packet on to packet management server 502. At step 610, the emitter transmits the packet to packet management server 502. Packet management server 502 may then transmit the packet to any other entity as desired. The filtering rules allow for only those comments desired to be acted upon by packet management server 502 to actually reach packet management server 502 despite what is generated by application 514.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for filtering application data, comprising:
   identifying, by a packet management server, a first emitter rule specifying first emitter identifier (emitter ID);
   determining that a first packet emitter having the first emitter ID is connected to the packet management server;
   responsive to determining that the first packet emitter having the first emitter ID is connected to the packet management server, transmitting the first emitter rule to the first packet emitter; and transmitting the first emitter rule from the packet management server to a second packet emitter having the first emitter ID,
wherein the first emitter rule includes a condition to be evaluated by packet emitters having the first emitter ID as a predicate to emitting packets containing the application data to the packet management server.

2. The method of claim 1, further comprising:
receiving a second emitter rule in configuration data;
determining that the second emitter rule specifies the first emitter ID;
determining that the first packet emitter and the second packet emitter have the first emitter ID; and
responsive to determining that the first packet emitter and the second packet emitter have the first emitter ID, transmitting the second emitter rule to the first packet emitter and the second packet emitter.

3. The method of claim 1, further comprising:
receiving, at the first packet emitter, a first packet of data from a first application associated with the first packet emitter;
evaluating the first packet of data based on the condition of the first emitter rule; and
determining whether to transmit the first packet of data to the packet management server or to discard the first packet of data based on the evaluating.

4. The method of claim 3, wherein:
the condition comprises a comparison between a value indicated by the condition and a value included in the first packet of data.

5. The method of claim 4, wherein:
the comparison includes one of equal to, less than, or greater than,
the value indicated by the condition includes a numerical value or an alphabetical value, and
the value included in the first packet of data includes a numerical value or an alphabetical value.

6. The method of claim 1, further comprising:
receiving a first packet of data from the first packet emitter;
identifying a first application data processing destination based on the first emitter ID;
transmitting the first packet of data to the first application data processing destination; and
processing the first packet of data according to a first application rule associated with the emitter ID and associated with the first application data processing destination.

7. The method of claim 6, wherein the first application rule comprises:
an indication that the first application data processing destination is to perform a first action based on the first packet and due to the first packet including the emitter ID that is associated with the first application.

8. The method of claim 6, further comprising:
examining the first application rule to determine that an indication of the first application data processing destination is included within the first rule; and
transmitting the first application rule to the first application data processing destination responsive to examining the first rule to determine that the indication of the first application data processing destination is included in the first rule.

9. A system for filtering application data, comprising:
a computing device including a processor and memory storing instructions that, when executed by the processor, cause the processor to execute a packet management server,
wherein the packet management server is configured to:
identify a first emitter rule specifying a first emitter identifier (emitter ID),
determine that a first packet emitter having the first emitter ID is connected to the packet management server,
responsive to determining that the first packet emitter having the first emitter ID is connected to the packet management server, transmit the first emitter rule to the first packet emitter; and
transmit the first emitter rule to a second packet emitter having the first emitter ID,
wherein the first emitter rule includes a condition to be evaluated by packet emitters having the first emitter ID as a predicate to emitting packets containing the application data to the packet management server.

10. The system of claim 9, wherein the packet management server is further configured to:
receive a second emitter rule in configuration data;
determine that the second emitter rule specifies the first emitter ID;
determine that the first packet emitter and the second packet emitter have the first emitter ID; and
responsive to determining that the first packet emitter and the second packet emitter have the first emitter ID, transmit the second emitter rule to the first packet emitter and the second packet emitter.

11. The system of claim 9, wherein the first packet emitter is configured to:
receive a first packet of data from a first application associated with the first packet emitter;
evaluate the first packet of data based on the condition of the first emitter rule; and
determine whether to transmit the first packet of data to the packet management server or to discard the first packet of data based on the evaluating.

12. The system of claim 11, wherein:
the condition comprises a comparison between a value indicated by the condition and a value included in the first packet of data.

13. The system of claim 12, wherein:
the comparison includes one of equal to, less than, or greater than,
the value indicated by the condition includes a numerical value or an alphabetical value, and
the value included in the first packet of data includes a numerical value or an alphabetical value.

14. The system of claim 9, wherein the packet management server is further configured to:
receive a first packet of data from the first packet emitter;
identify a first application data processing destination based on the first emitter ID;
transmit the first packet of data to the first application data processing destination; and
process the first packet of data according to a first application rule associated with the emitter ID and associated with the first application data processing destination.

15. The system of claim 14, wherein the first application rule comprises:
an indication that the first application data processing destination is to perform a first action based on the first packet and due to the first packet including the emitter ID that is associated with the first application.

16. The system of claim 14, wherein the packet management server is further configured to:
   examine the first application rule to determine that an indication of the first application data processing destination is included within the first rule; and
   transmit the first application rule to the first application data processing destination responsive to examining the first rule to determine that the indication of the first application data processing destination is included in the first rule.

17. A non-transitory computer-readable medium storing instructions that, when executed by a processor, cause the processor to perform a method for filtering application data, the method comprising:
   identifying, by a packet management server, a first emitter rule specifying a first emitter identifier (emitter ID);
   determining that a first packet emitter having the first emitter ID is connected to the packet management server;
   responsive to determining that the first packet emitter having the first emitter ID is connected to the packet management server, transmitting the first emitter rule to the first packet emitter; and
   transmitting the first emitter rule from the packet management server to a second packet emitter having the first emitter ID,
   wherein the first emitter rule includes a condition to be evaluated by packet emitters having the first emitter ID as a predicate to emitting packets containing the application data to the packet management server.

\* \* \* \* \*